(12) United States Patent
Capurso et al.

(10) Patent No.: US 7,689,459 B2
(45) Date of Patent: Mar. 30, 2010

(54) CARD WITH EMBEDDED BISTABLE DISPLAY HAVING SHORT AND LONG TERM INFORMATION

(75) Inventors: Robert G. Capurso, Bergen, NY (US); Stanley W. Stephenson, Spencerport, NY (US); Domenic Maiola, Rochester, NY (US); David M. Johnson, Rochester, NY (US)

(73) Assignee: Industiral Technology Research Institute, Hsinchu (TW)

( * ) Notice: Subject to any disclaimer, the term of this patent is extended or adjusted under 35 U.S.C. 154(b) by 1636 days.

(21) Appl. No.: 10/669,741

(22) Filed: Sep. 24, 2003

(65) Prior Publication Data

US 2005/0065884 A1    Mar. 24, 2005

(51) Int. Cl.
*G06G 1/12* (2006.01)
*G02F 1/1333* (2006.01)
*G06K 5/00* (2006.01)

(52) U.S. Cl. ............................ 705/21; 349/86; 235/380
(58) Field of Classification Search .................... 705/41, 705/17
See application file for complete search history.

(56) References Cited

U.S. PATENT DOCUMENTS

| | | | |
|---|---|---|---|
| 4,870,604 A | 9/1989 | Tatsuno | |
| 5,034,599 A | 7/1991 | Hirata | |
| 5,056,060 A | 10/1991 | Fitch et al. | |
| 5,359,183 A | 10/1994 | Skodlar | |
| 5,867,795 A | 2/1999 | Novis et al. | |
| 5,984,184 A | 11/1999 | Kojima | |
| 5,987,439 A * | 11/1999 | Gustin et al. | 705/43 |
| 6,019,284 A * | 2/2000 | Freeman et al. | 235/380 |
| 6,297,789 B2 | 10/2001 | Gauthier et al. | |
| 6,364,550 B1 * | 4/2002 | Petteruti | 400/88 |
| 6,365,238 B1 * | 4/2002 | Dubal | 428/1.1 |
| 6,372,307 B1 * | 4/2002 | Ji et al. | 428/1.1 |
| 6,758,404 B2 | 7/2004 | Ladyansky | |
| 6,816,146 B2 * | 11/2004 | Harada et al. | 345/107 |
| 6,853,412 B2 * | 2/2005 | Stephenson | 349/86 |
| 7,174,317 B2 * | 2/2007 | Phillips et al. | 705/41 |
| RE40,137 E * | 3/2008 | Tuttle et al. | 438/19 |
| 7,360,688 B1 * | 4/2008 | Harris | 235/380 |
| 2002/0135707 A1 * | 9/2002 | Stephenson | 349/12 |

(Continued)

OTHER PUBLICATIONS

U.S. Appl. No. 10/134,185, filed Apr. 29, 2002 by Stephenson et al.

*Primary Examiner*—Matthew S Gart
*Assistant Examiner*—Ashford Hayles
(74) *Attorney, Agent, or Firm*—Alston & Bird LLP

(57) ABSTRACT

A transaction card system includes a transaction cared with a display tag for displaying short term information, the character display having optical states that are stable without power and viewable from one side of the display tag and an array of electrical contacts for electrically addressing the character display from the other side of the tag, a contact window through which the contacts are accessible, machine readable data on the card, and long term information printed on the transaction card; a transaction card writer having a reader for reading the machine readable data and having means for updating the short term information displayed on the transaction card; and a central computer connected to the transaction card writer having a data base and a central processor for receiving the information read by the magnetic card reader and generating display commands for the transaction card writer.

15 Claims, 7 Drawing Sheets

U.S. PATENT DOCUMENTS

| | | | |
|---|---|---|---|
| 2003/0057278 A1* | 3/2003 | Wong | 235/451 |
| 2003/0106935 A1* | 6/2003 | Burchette, Jr. | 235/380 |
| 2003/0136849 A1* | 7/2003 | Adelmann | 235/492 |
| 2004/0118930 A1* | 6/2004 | Berardi et al. | 235/492 |
| 2004/0155104 A1* | 8/2004 | Mitchell, Jr. | 235/380 |

* cited by examiner

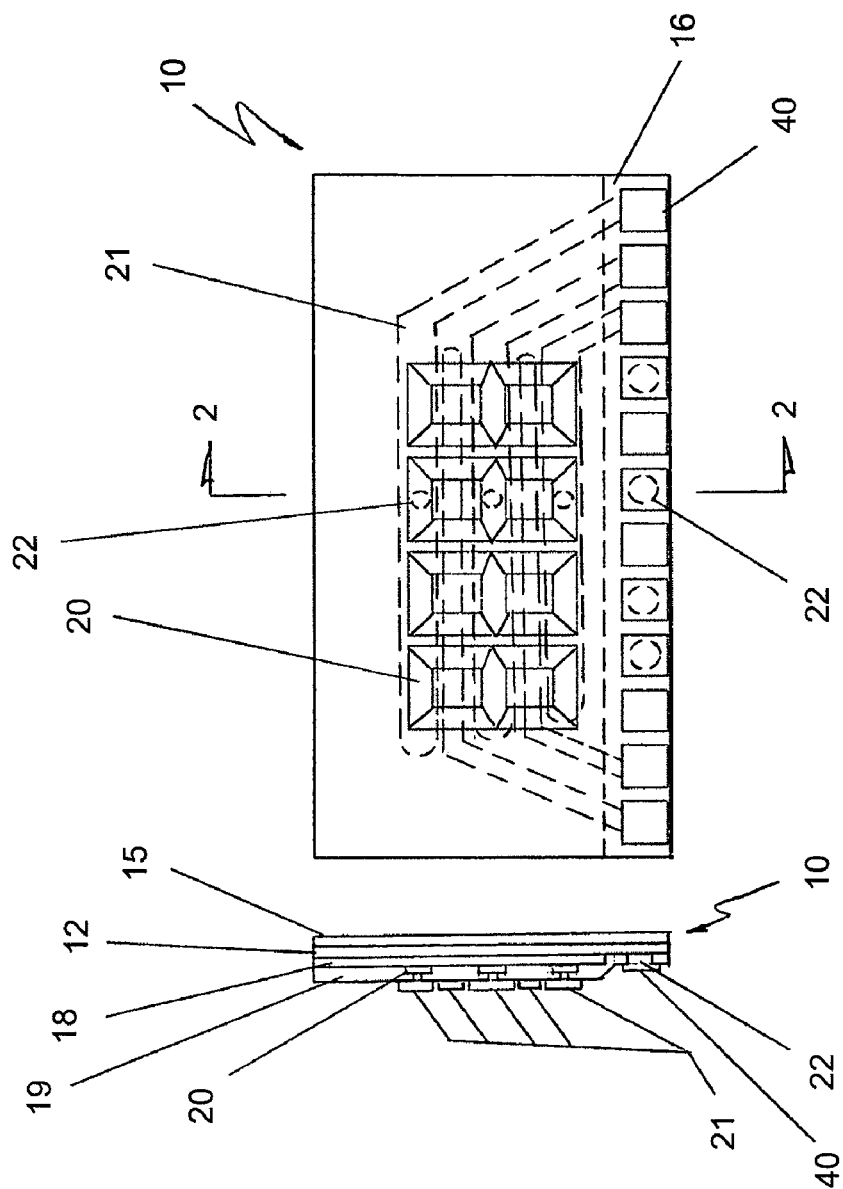

CARD WITH EMBEDDED BISTABLE DISPLAY HAVING SHORT AND LONG TERM INFORMATION

FIELD OF THE INVENTION

The present invention relates to transaction cards having an embedded bistable display and a display writing system.

BACKGROUND OF THE INVENTION

There is a growing use of transaction cards having a changeable value amount associated to it. These cards typically have long term information devices such as a magnetic strip or chip embedded that relates to a database holding the current value for that card. Other long term information on the card may be printed images done by way of, for instance, a thermal printing device. With subsequent usage of the card, a reduced or increased value is assessed to the database relating to the card. The consumer, however, has no visual indication on the card showing what amount remains until the next use. There is, therefore, a need for an indicator which shows the short term amounts at any given time on the card throughout its life. Such cards could be used for allotments of credits, such as phone cards and arcade games, and monetary amounts such as gift cards and pre-set credit cards. This can be accomplished with a thin, bistable display embedded within the card showing the ever changing amounts. A read/write device at the point of sale will send the card data from the magnetic strip of memory chip to the database and receive back new short term information to be electronically written to the card prior to withdrawing it from the read/write device. Subsequent use of the card continues to change the short term visual information in accordance with the database.

There is therefore a need for an improved transaction card that holds long term data and images as well as short term visible information.

SUMMARY OF THE INVENTION

The need is met according to the present invention by providing a transaction card system that includes a transaction card with a display tag for displaying short term information, the character display having optical states that are stable without power and viewable from one side of the display tag, and an array of electrical contacts for electrically addressing the character display from the other side of the tag, a contact window through which the contacts are accessible, machine readable data on the card, and long term information printed on the transaction card; a transaction card writer having a reader for reading information stored on the magnetic stripe of the transaction card and having means for updating the short term information displayed on the transaction card; and a central computer connected to the transaction card writer having a database and a central processor for receiving the data read by the transaction card writer and generating display commands for the transaction card writer.

ADVANTAGES

The invention has the advantage of providing a transaction card system that updates and displays short term information relating to the use of the transaction card with an inexpensive and easily manufactured transaction card that does not contain any active electronics.

BRIEF DESCRIPTION OF THE DRAWINGS

FIG. 1 is a front view of a character display tag according to the present invention;

FIG. 2 is a cross sectional view of a character display tag taken along lines 2-2 in FIG. 1;

DETAILED DESCRIPTION OF THE INVENTION

Figure 3:
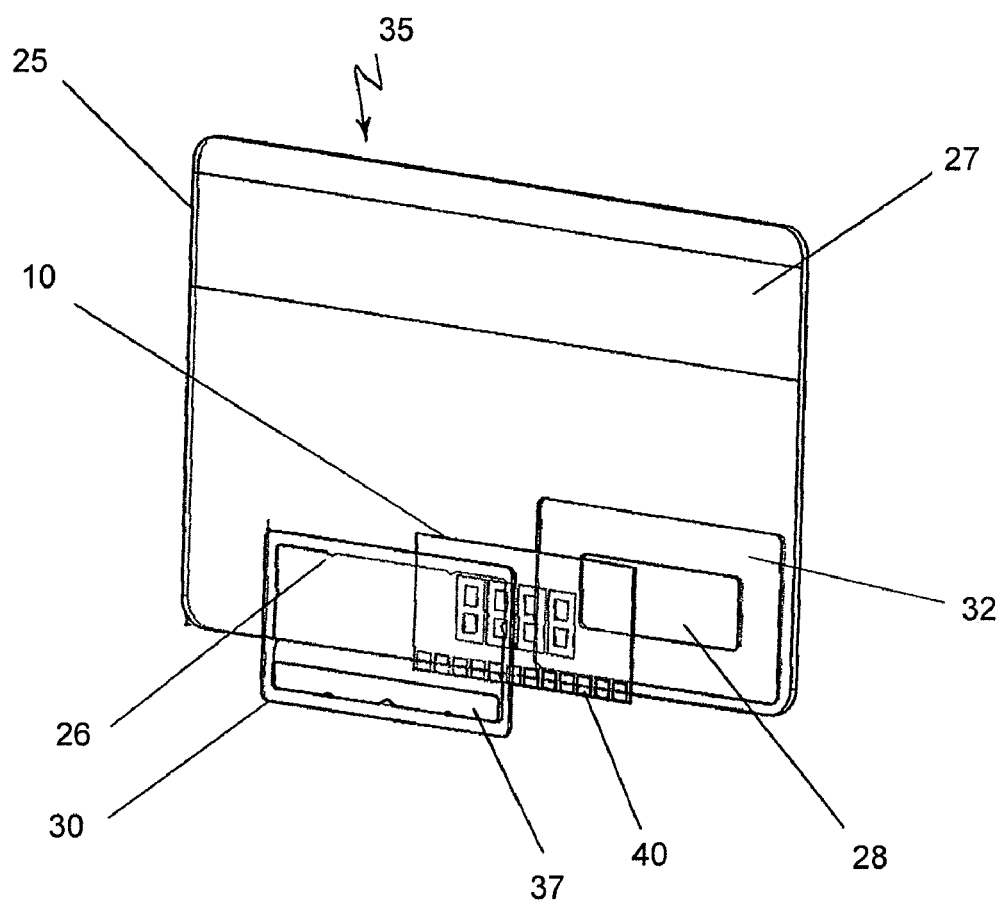
FIG. 3 is an exploded back view of a transaction card according to the present invention.

Referring to FIGS. 1 and 2, a character display tag 10 is constructed by forming a conductive common electrode layer 12 on a substrate 15. A layer of bistable liquid crystal material 18 is deposited, for example by roll coating, over the conductive common electrode layer 12, leaving an exposed area 16 of layer 12 for making electrical contact. Electrically conductive character segments 20 are then formed, for example by thick film printing over the bistable liquid crystal layer 18. The character segments 20 may be arranged as numbers 0-9, a slash, a decimal point, a dollar sign, or a cent sign. A dielectric layer 19 is then printed over the character segments 20, leaving via holes 22 over each character segment 20. Electrically conductive traces 21 are printed over the dielectric layer 19 which flows through the via holes 22, making contact with the conductive character segments 20.

The conductive traces 21 terminate at the bottom of the tag 10 to form a plurality of contact pads 40. The optical state of the bistable liquid crystal material 18 between the character segments 20 and the electrode layer 12 can be changed by selectively applying drive voltages to the contact pads 40 which are electrically connected to the character segments 20 and the electrode layer 12. Once the optical state of the bistable material has been changed, it remains in that state indefinitely without further power being applied to the electrodes. The character display tag can be made as shown for example in U.S. Ser. No. 10/134,185, filed Apr. 29, 2002 by Stephenson et al., which is incorporated herein by reference.

Referring to FIG. 3, a card body 25 is shown with a front window 28 allowing front side viewing of tag 10 and a cap 30 to encapsulate the tag 10 within the card body 25 by a means of sealing, one of which is ultrasonic. The tag 10 is positioned within the card body 25 by way of locator darts 26. The cap 30 is placed in recess 32 of the back of card body 25. The cap 30 is ultrasonically sealed in the recess 32 to the card body 25.

Figure 4:
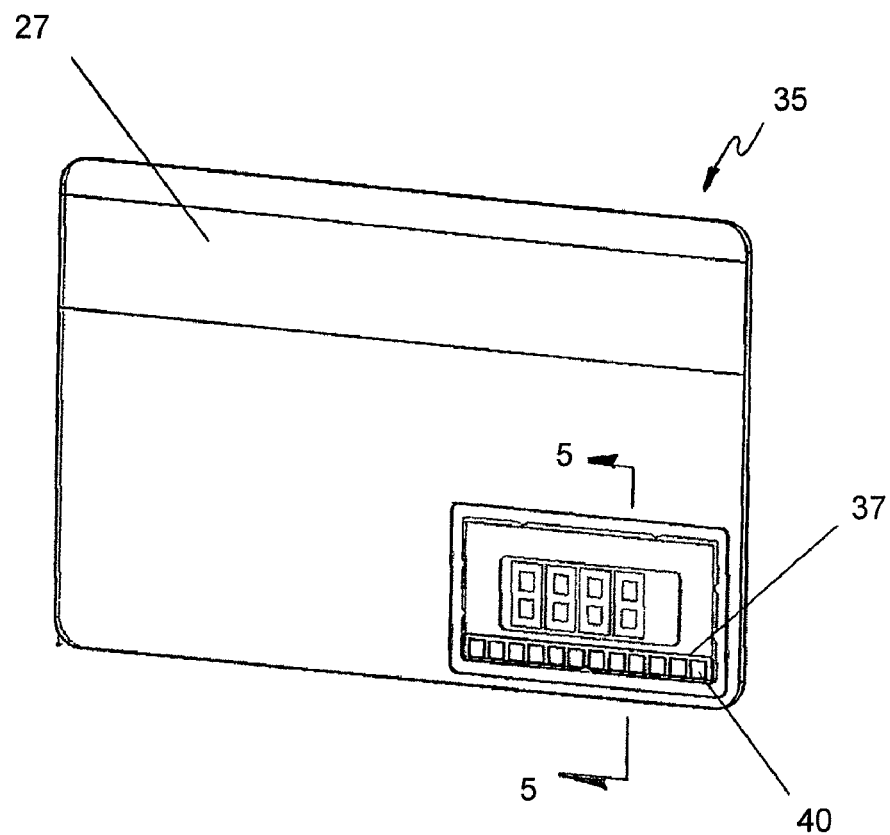
FIG. 4 is an assembled back view of the transaction card of FIG. 3.

FIG. 4 shows an assembled transaction card 35 with an opening 37 in cap 30 to allow external electrical contacts to reach contact pads 40 of tag 10. The card also includes means for providing machine readable data, for example a magnetic strip 27 which holds stored data pertaining to the transaction card 35. Alternatively, the means for providing machine readable data may comprise an embedded memory chip with exposed contacts on the card body, an RFID chip embedded in the card body 25, or a bar code printed on the card body.

Figure 5:
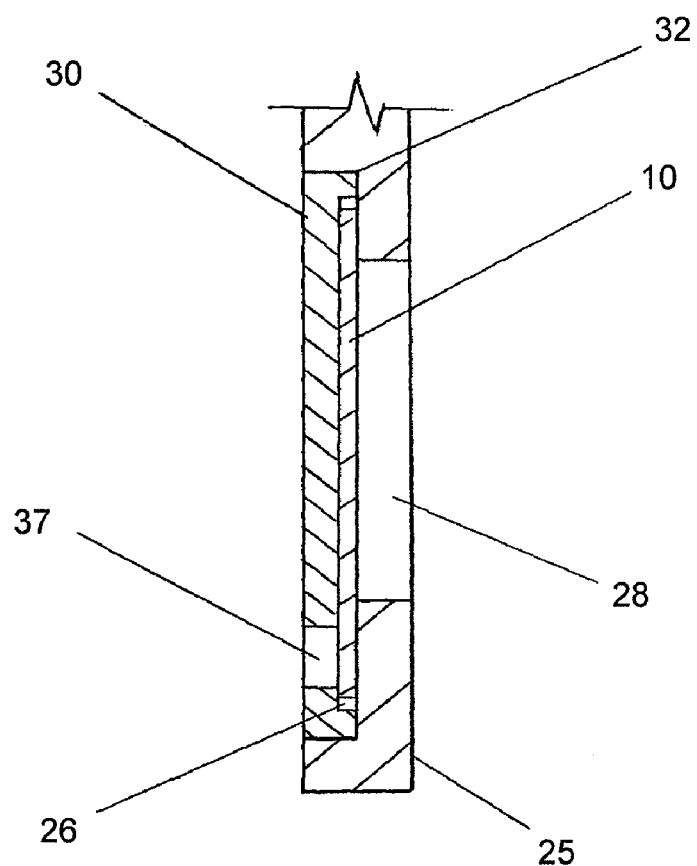
FIG. 5 is a cross section view of an assembled transaction card taken along 5-5 of FIG. 4.

FIG. 5 is a section view derived from FIG. 4 showing an enlargement of the tag portion of the assembled transaction card 35. The cap 30 after being sealed into recess 32 becomes coplanar with the back of the card body 25, allowing uninterrupted insertion into a card writer.

Figure 6:
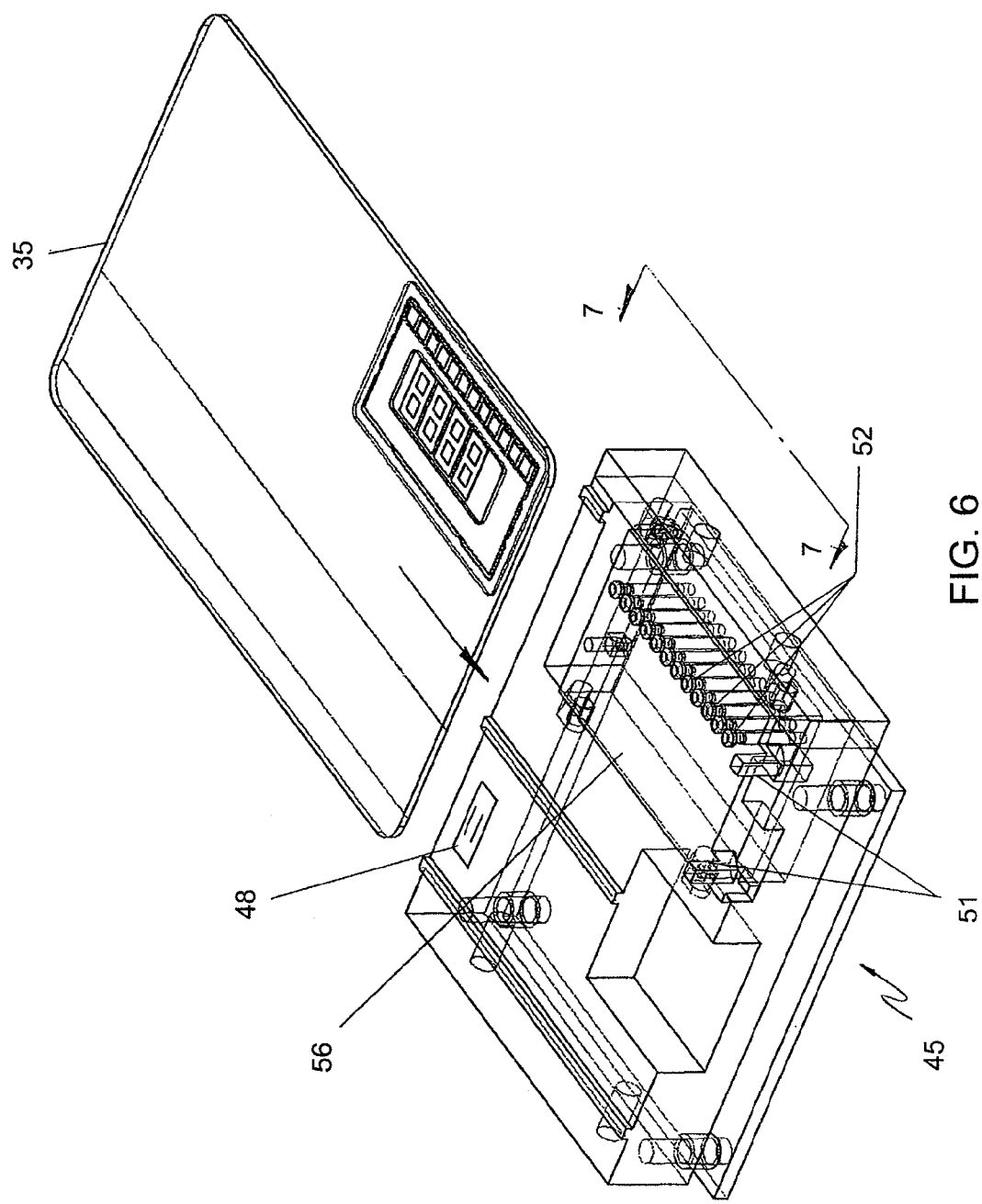
FIG. 6 is a perspective view of a transaction card writer used to electrically change the short term information on the transaction card according to the present invention.
Figure 7:
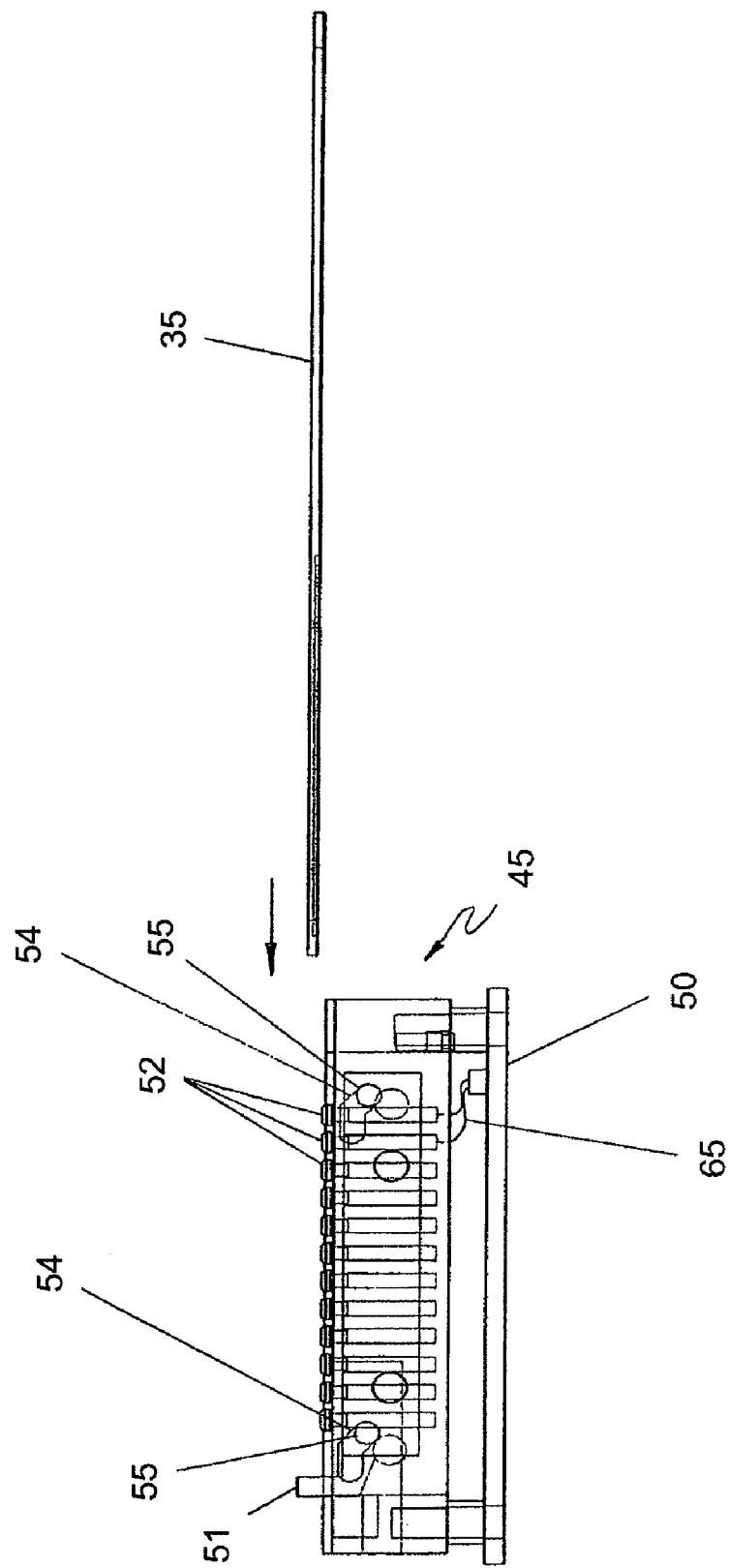
FIG. 7 is a side view of the transaction card writer of FIG. 6.

Referring to FIGS. 6 and 7, a transaction card writer 45 is shown which can read a magnetic strip 27 as well as write to the display tag 10. Upon insertion into a slot, a magnetic strip reader 48 reads the magnetic strip 27 to determine the card data stored on the strip and relates it to the stored data on a database. As insertion is completed, the card pushes against fingers 51, raising contact sled 56 by way of a camming angle 54 between the transaction card writer 45 and posts 55 of contact sled 56 which holds contact pins 52. When contact sled 56 is fully raised, the contact pins 52 come in contact with the contact pads 40 of display tag 10 allowing electrical signals to change the state of the conductive segments 20.

Figure 8:
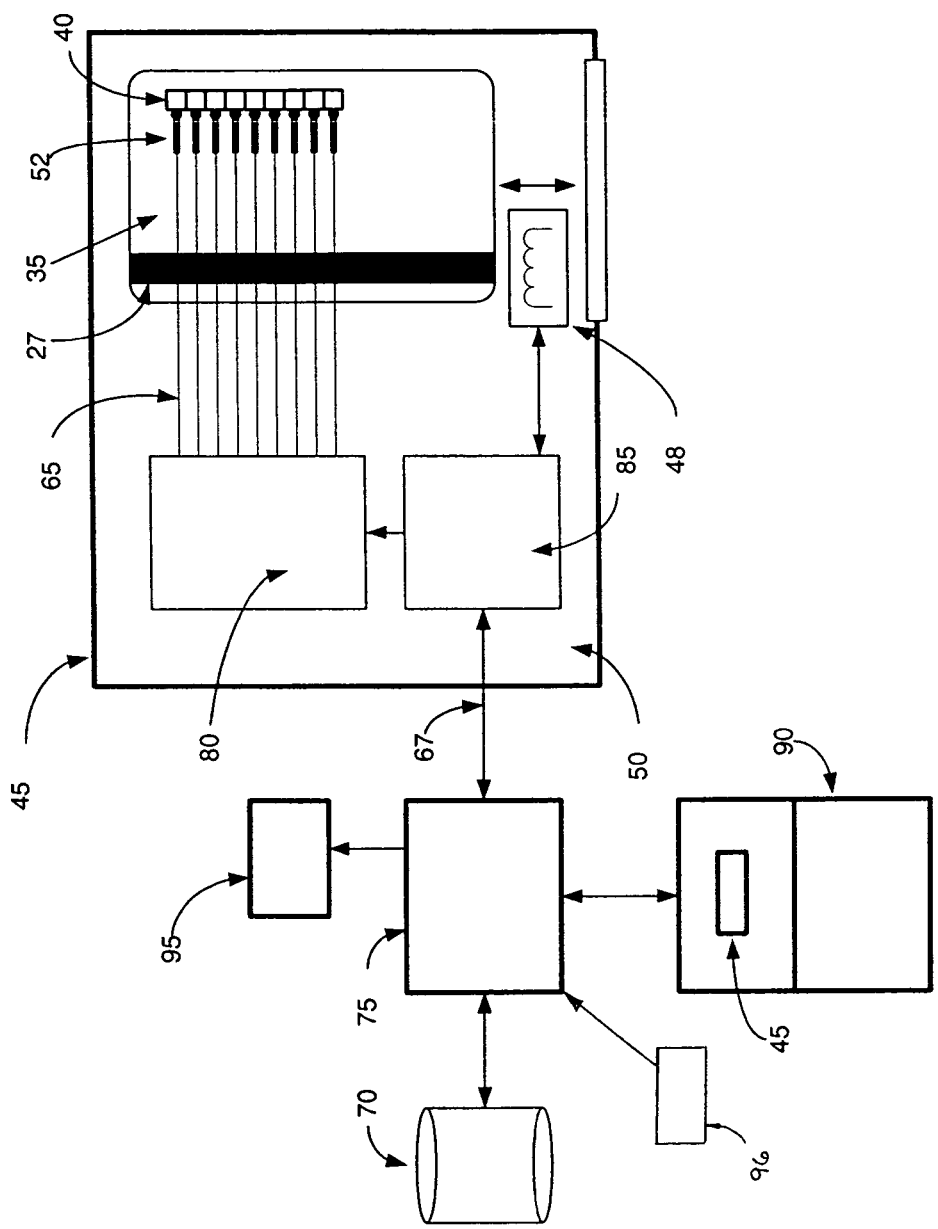
FIG. 8 is a schematic block diagram of a transaction card system according to the present invention.

FIG. 8 shows a schematic block diagram of a transaction card system according to the present invention. A central computer 75 contains a database 70 having stored data pertaining to individual transaction cards 35. A transaction card writer 45 includes a reading device 48, which reads the machine readable data from the transaction card 35. Within transaction card writer 45 is a control circuit board 50 with a display driver controller 80, a plurality of contact pins 52, and wires 65 from the pins 52 to the control circuit board 50. Cable 67 is connected between a controller 85 on the control circuit board 50 and to the central computer 75.

A printer 95 such as a thermal printer, can be provided to print long term information on transaction card 35 when the card is first issued to a transaction card holder. The images originating from computer 75 are sent to the printer 95. The printing of long term information can thus be done locally and customized with individual card issuer information and markings.

A transaction card writer 45 can also be provide as part of a terminal 90, which can be used to originally issue or recharge value to the transaction card 35. At original issue, the issuer of the card would indicate to the computer 75 via an operator interface, such as a keyboard 96, the nature and value of the card. A new card would be printed by the printer 95 and written by transaction card writer 45 to show the value of the card. If additional value is desired for the transaction card 35, the transaction card can be inserted into a transaction card writer 45 within the terminal 90. The database 70 would recognize the card identification from the machine readable data on the card. Once the desired increased amount is paid for by either cash payment or charged from a credit or debit card, the value is updated in the database 70 by way of the central computer 75. The new value is then sent to the transaction card writer 45 within the terminal 90 and written to the transaction card 35. The transaction to increase the value of the card can be performed by a clerk, or can be performed automatically by the terminal 90.

The transaction card system of the present invention can be used, for example, to provide a prepaid gift card; a prepaid game card; a preset limit credit card; a prepaid service card for services such as utilities, gasoline, telephone, transportation, college bookstores, cafeterias, theatre, or concerts; a cumulated credit card where an accumulated credit due to the use of the card is displayed on the card; a library card indicating when the book is due where the information stored in the card is the ID of a book and the information displayed on the card is the due date of the book; a club membership card where the short term information relates to club privileges; a video store card where the short term information relates to a number of video rentals due to the holder of the card; a "frequent flyer" card where the short term information shows the number of miles (credits) accumulated.

For example, if the transaction card is a prepaid card, the following process could take place. The card would be purchased from a retailer for a given amount, e.g. $50, and an account in that amount associated with the identifier on the card would be created in the database. The retailer would produce the card and write the prepaid amount into the card to show on the display tag. When a card holder uses the card to purchase a item or a service, the provider of the item or service would communicate the value of the transaction to the computer and the value would be deducted from the balance in the database and a new remaining balance would be displayed on the card.

In the example where the transaction card is a credit card with a cumulative limit, the issuer of the credit card would supply the card with an agreed upon credit limit which would be displayed on the card and recorded in the database. As each purchase is made with the card, the remaining credit value in the database would be updated and displayed on the card. When the credit value reaches zero, further credit would be denied to the card holder. When a payment is made toward the credit card, the database is updated to show the new available credit. The next time the credit card is used, the amount of remaining available credit is updated to show the balance of credit after the payment and any further transactions.

The invention has been described in detail with particular reference to certain preferred embodiments thereof, but it will be understood that variations and modifications can be effected within the spirit and scope of the invention.

PARTS LIST 10 character display tag
12 common electrode layer
15 substrate
16 exposed area
18 bistable liquid crystal layer
19 dielectric layer
20 conductive character segments
21 conductive traces
22 via holes
25 card body
26 locator darts
27 magnetic strip
28 window
30 cap
32 backside recess
35 transaction card assembly
37 cap opening
40 tag contact pads
45 transaction card writer
48 magnetic strip reader
50 circuit board w/drivers
51 fingers
52 contact pins
54 camming angle
55 contact sled posts
56 contact sled
65 wires
67 cable
70 central computer database
75 central computer
80 display driver controller
85 card writer microprocessor
90 terminal
95 printer
96 keyboard

What is claimed is:

1. A transaction card, comprising:
 a) a card body defining a recess and a viewing window in the recess, the card body having long term information printed thereon;
 b) a display tag including a character display for displaying short term information, the character display having optical states that are stable without power and viewable from one side of the tag, the display tag also including an array of contacts for addressing the character display from the other side of the tag, the array of contacts being directly connected to the character display via conductive traces, the display tag being located in the recess with the character display being viewable through the viewing window;

c) a cap defining a contact window, the cap being mounted in the recess over the display tag with the contacts being accessible through the contact window, an exposed surface of the cap being coplanar with a back surface of the card body; and d) means for providing machine readable data.

2. The transaction card claimed in claim 1, wherein the means for providing machine readable data is a magnetic stripe on the card body, an embedded memory chip with exposed contacts on the card body, an RFID chip embedded in the card body, or a bar code printed on the card body.

3. The transaction card claimed in claim 1, wherein the display tag comprises a bistable cholesteric liquid crystal display.

4. The transaction card claimed in claim 2, wherein the display tag comprises:

a) a substrate;

b) a common electrode layer located on the substrate and defining a common electrode for each character in the display, the common electrodes including a contact portion that extends to an edge of the display;

c) a bistable liquid crystal layer located over the common electrode layer, the bistable liquid crystal layer extending up to, but not over the contact portions of the common electrode layer;

d) a plurality of conductive character elements located on the bistable liquid crystal layer over each of the common electrodes;

e) a dielectric layer located over the conductive character elements, the dielectric layer defining vias to the character elements; and f) a corresponding plurality of conductive traces on the dielectric layer and in electrical contact with respective conductive character elements through the respective vias and extending from the respective vias to the edge of the display tag.

5. A transaction card system, comprising:

a) a transaction card having i) a card body defining a recess and a viewing window in the recess, the card body having long term information printed thereon;

ii) a display tag including a character display for displaying short term information, the character display having optical states that are stable without power and viewable from one side of the tag, the display tag also including an array of contacts for addressing the character display from the other side of the tag, the array of contacts being directly connected to the character display via conductive traces, the display tag being located in the recess with the character display being viewable through the viewing window;

iii) a cap defining a contact window, the cap being mounted in the recess over the display tag with the contacts being accessible through the contact window, an exposed surface of the cap being coplanar with a back surface of the card body; and iv) means for providing machine readable data;

b) a transaction card writer having, i) a reader for the machine readable data;

ii) an array of electrical contact pins arranged for making contact with the display tag through the contact window in the cap; and iii) control electronics including means for receiving display commands and producing drive signals to the electrical contacts and means for communicating the machine readable data; and c) a central computer connected to the transaction card writer and having a data base and a central processor for receiving the data read by the magnetic card reader and generating display commands for the transaction card writer.

6. The system claimed in claim 5, wherein the means for providing machine readable data is a magnetic stripe on the card body, an embedded memory chip with exposed contacts on the card body, an RFID chip embedded in the card body, or a bar code printed on the card body.

7. The system claimed in claim 5, wherein the machine readable data is a unique identifier; the data base contains information relating to privileges due to the holder of the card; and the central computer retrieves currently available privilege information based on the unique identifier, updates the information in the data base based on any current transaction and outputs a display command corresponding to the currently available privilege.

8. The system claimed in claim 5, further comprising a terminal connected to the central computer for indicating the receipt of value, the terminal including a transaction card writer for updating the short term information displayed on the transaction card based on the value received; and the computer including means for updating the privilege information based on the amount of value received.

9. The system claimed in claim 8, wherein the terminal is an automated terminal including a credit card reader or a cash receiver.

10. The system claimed in claim 8, wherein the value is received in the form of cash.

11. The system claimed in claim 8, wherein the value is received in the form of an electronic credit or debit transaction.

12. The system claimed in claim 5, further comprising a printer connected to the central computer for printing the long term information on the transaction card.

13. The system card writer claimed in claim 12, further comprising a writer connected to the central computer for writing machine readable data on the card.

14. The transaction card claimed in claim 1, wherein the short term information defines a variable amount applicable at any time throughout the transaction card's life, the variable amount being indicative of club privileges, a due date of a book, a number of video rentals or a number of credits accumulated, and wherein the long term information comprises a printed image or information stored on a magnetic strip or embedded chip.

15. The system claimed in claim 5, wherein the short term information defines a variable amount applicable at any time throughout the transaction card's life, the variable amount being indicative of club privileges, a due date of a book, a number of video rentals or a number of credits accumulated, and wherein the long term information comprises a printed image or information stored on a magnetic strip or embedded chip.

* * * * *

UNITED STATES PATENT AND TRADEMARK OFFICE
CERTIFICATE OF CORRECTION

Page 1 of 1

PATENT NO. : 7,689,459 B2
APPLICATION NO. : 10/669741
DATED : March 30, 2010
INVENTOR(S) : Capurso et al.

It is certified that error appears in the above-identified patent and that said Letters Patent is hereby corrected as shown below:

Title page,
(73) Assignee, "Industiral" should read --Industrial--.

Signed and Sealed this
Eleventh Day of January, 2011

David J. Kappos
Director of the United States Patent and Trademark Office